(12) United States Patent
Maltseff

(10) Patent No.: US 8,508,369 B2
(45) Date of Patent: Aug. 13, 2013

(54) RFID TAG SYSTEM WITH BLOCK CODING, SUCH AS SPACE-TIME BLOCK CODING

(75) Inventor: Paul A. Maltseff, Woodinville, WA (US)

(73) Assignee: Intermec IP Corp., Everett, WA (US)

( * ) Notice: Subject to any disclaimer, the term of this patent is extended or adjusted under 35 U.S.C. 154(b) by 605 days.

(21) Appl. No.: 12/446,445

(22) PCT Filed: Mar. 29, 2007

(86) PCT No.: PCT/US2007/065455
§ 371 (c)(1),
(2), (4) Date: Jun. 29, 2010

(87) PCT Pub. No.: WO2008/027619
PCT Pub. Date: Mar. 6, 2008

(65) Prior Publication Data
US 2010/0277318 A1 Nov. 4, 2010

Related U.S. Application Data

(60) Provisional application No. 60/841,736, filed on Sep. 1, 2006.

(51) Int. Cl.
*G08B 13/14* (2006.01)
(52) U.S. Cl.
USPC .......... 340/572.1; 340/572.2; 340/572.3; 340/5.22; 340/5.23; 340/5.24; 340/10.1; 340/10.3; 340/10.4
(58) Field of Classification Search
USPC .......... 340/5.1–5.5, 10.1–10.5, 572.1–572.9; 235/375–385; 455/101
See application file for complete search history.

(56) References Cited

U.S. PATENT DOCUMENTS

| | | | |
|---|---|---|---|
| 4,442,527 | A | 4/1984 | Munday |
| 5,077,753 | A | 12/1991 | Grau, Jr. et al. |
| 5,940,006 | A | 8/1999 | MacLellan et al. |
| 6,115,426 | A | 9/2000 | Fujimoto et al. |
| 6,117,861 | A | 9/2000 | Engel et al. |
| 6,127,917 | A | 10/2000 | Tuttle |
| 6,177,861 | B1 | 1/2001 | MacLellan et al. |
| 6,384,712 | B1 | 5/2002 | Goldman et al. |
| 6,865,237 | B1 | 3/2005 | Boariu et al. |
| 7,017,639 | B2 | 3/2006 | McDonald |

(Continued)

OTHER PUBLICATIONS

Gesbert et al., "Breaking the barriers of Shannon's capacity: An overview of MIMO wireless systems," Telenor's Journal: Telektronikk, Department of Informatics, University of Oslo, Norway, Jan. 2002, 9 pages.

(Continued)

*Primary Examiner* — Tai T Nguyen
*Assistant Examiner* — Ojiako Nwugo
(74) *Attorney, Agent, or Firm* — Perkins Coie LLP

(57) ABSTRACT

An apparatus for use in an RFID data collection system includes an antenna portion for wirelessly exchanging signals and a memory portion for storing RFID data. A signal processing portion is coupled among the antenna portion and the memory portion. The signal processing portion is configured to receive RFID data and to at least encode or decode the received RFID data via space-time block codes (STBC). For example, an RFID tag employs two spatially separated antennas and circuitry for transmitting to an RFID reader data stored in tag memory as STBC encoded data. Other configurations are also disclosed.

22 Claims, 4 Drawing Sheets

(56) References Cited

U.S. PATENT DOCUMENTS

| | | |
|---|---|---|
| 7,019,639 B2 | 3/2006 | Stilp |
| 7,023,817 B2 | 4/2006 | Kuffner et al. |
| 7,242,293 B2 | 7/2007 | Rea et al. |
| 7,359,466 B2 | 4/2008 | Huang et al. |
| 7,398,932 B2 | 7/2008 | Ashili et al. |
| 7,423,961 B2 | 9/2008 | Ogawa et al. |
| 7,599,325 B2 | 10/2009 | Lin et al. |
| 7,609,780 B2 | 10/2009 | Sadowsky |
| 7,804,907 B2 | 9/2010 | Nagai |
| 2003/0072452 A1* | 4/2003 | Mody et al. ............ 380/274 |
| 2004/0179588 A1 | 9/2004 | Kuffner et al. |
| 2005/0237184 A1 | 10/2005 | Muirhead |
| 2006/0071807 A1 | 4/2006 | Sadowsky |
| 2007/0059901 A1* | 3/2007 | Majumdar et al. ......... 438/455 |
| 2007/0126585 A1* | 6/2007 | Okunev et al. ........... 340/572.7 |
| 2007/0229261 A1* | 10/2007 | Zimmerman et al. ..... 340/572.1 |
| 2008/0113632 A1* | 5/2008 | Chae et al. ............... 455/101 |
| 2010/0214065 A1 | 8/2010 | Maltseff et al. |
| 2010/0271179 A1 | 10/2010 | Maltseff |

OTHER PUBLICATIONS

HP New Release, "HP Unveils Revolutionary Wireless Chip that Links the Digital and Physical Worlds," http://www.hp.com/hpinfo/newsroom/press/2006/060717a.html, Palo Alto, California, Jul. 17, 2006, 2 pages.

Edfors et al., "An Introduction to Orthogonal Frequency-Division Multiplexing," Sep. 1996.

digitalradiotech.co.uk, Coded Orthogonal Frequency Division Multiplexing (COFDM), http://www.digitalradiotech.co.uk.cofdm.htm, accessed Apr. 2, 2007, 20 pages.

International Search Report and Written Opinion, International Application No. PCT/US07/65455, Applicant: Intermec IP Corp., mailed Mar. 14, 2008, 12 pages.

U.S. Appl. No. 12/446,439, filed Apr. 20, 2009, Maltseff et al.

U.S. Appl. No. 12/446,442, filed Apr. 20, 2009, Maltseff.

Yu Chang, Yigbo Hua, Xiang-Gen Xia, and Brian Sadler, "An insight into space-time block codes using Hurwitz-Radon families of matrices," Science Direct, www.sciencedirect.com, 2008, 33 pages.

Jun Shi and Richard D. Wesel, "Channel-Eigenvector Invariant Space Time Constellations," UCLA, 2004, Los Angeles, California, 5 pages.

S.M. Alamouti, A Simple Transmit Diversity Technique for Wireless Communication, IEEE Journal on Select Areas in Communication, vol. 16, No. 8, Oct. 1998, 7 pages.

* cited by examiner

RFID TAG SYSTEM WITH BLOCK CODING, SUCH AS SPACE-TIME BLOCK CODING

CROSS-REFERENCE TO RELATED APPLICATIONS

This application is a U.S. National Phase application of International Application Serial No. PCT/US2007/065455, filed on Mar. 29, 2007, which claims the benefit of U.S. Provisional Patent Application No. 60/841,736, filed Sep. 1, 2006, the entire contents of each of which are incorporated herein by reference.

BACKGROUND

RFID (radio frequency identification) technology has gained momentum in the last decade as a solution for tracking resources in supply chain logistics. The ever increasing demands for data have drawn the attention to the search of new approaches for communication between RFID tags and readers to decrease the communication time between every particular tag and reader. For example, Hewlett Packard Corp. has unveiled a new wireless chip capable to communicate with the speed up to 10 Megabits per second. See, *HP Unveils Revolutionary Wireless Chip that Links the Digital and Physical Worlds—Grain-sized chip could be attached to almost any object, making information more ubiquitous*, HP Press Release from Jul. 17, 2006. However, the communication distance for this device is limited to a few inches due to the employment of inductive coupling for harvesting energy and communication.

DETAILED DESCRIPTION

Briefly, and in general terms, the present system provides a new approach to communications between RFID tags and readers based on space-time block codes (STBC) and employing multiple antennas for spatial diversity (or employing other forms of diversity).

Various embodiments or examples of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Figure 1:
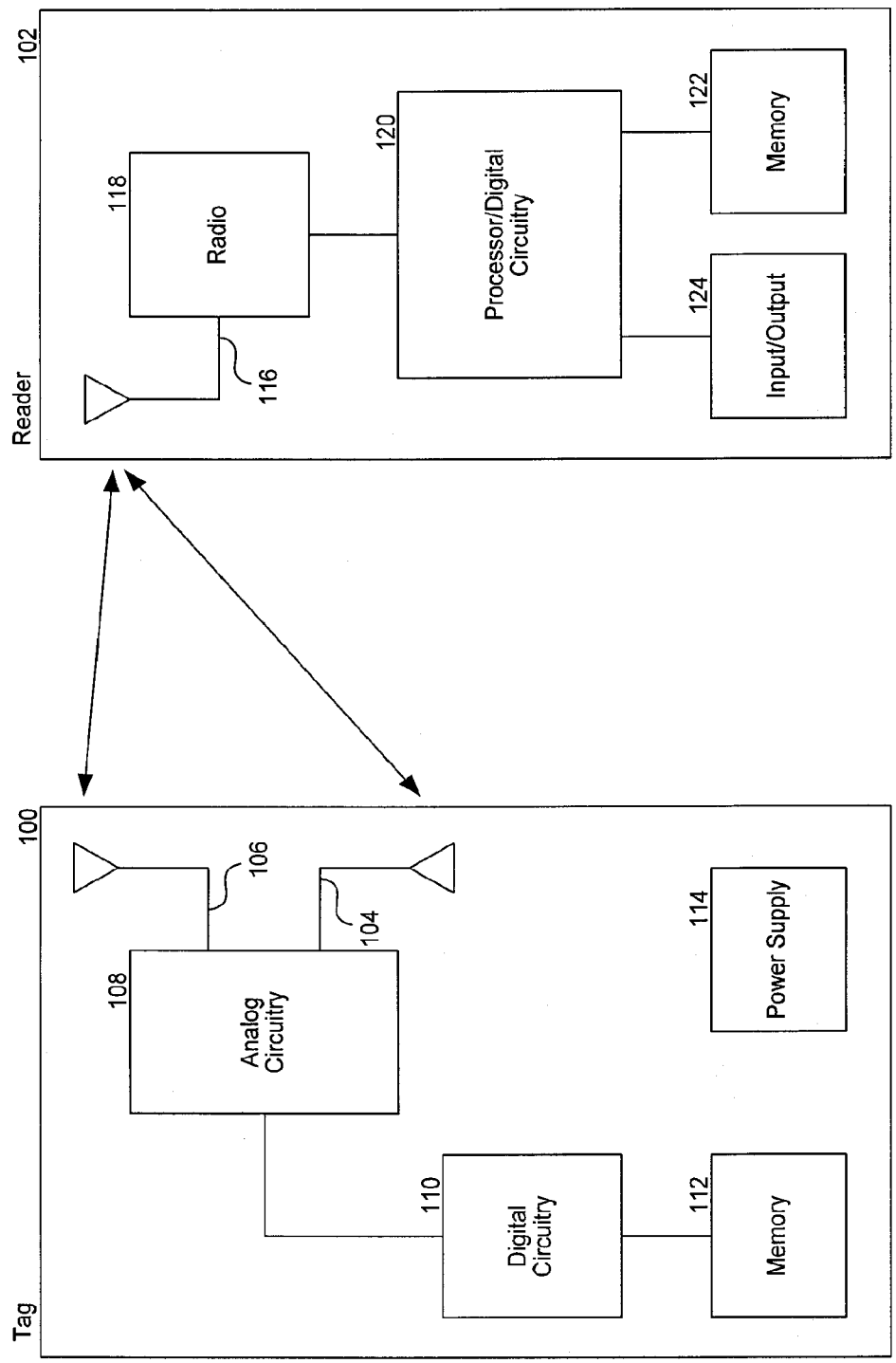
FIG. 1 is a block diagram showing an example of a RFID tag and associated reader employing aspects of the invention.

Referring to FIG. 1, an example of an RFID tag 100 and reader 102 is shown. The tag 100 includes two tag antennas 104 which receive signals from and transmit signals to the reader 102. Tag analog circuitry 108, coupled to the tag antennas, provides for data transfer with the reader by modulating a signal for transmission and receiving signals from the reader. Digital circuitry 110, coupled to the tag analog circuitry, can be of many types, including dedicated logic devices, gate arrays, a microprocessor, or other digital signal processing circuitry, together with any necessary software. The digital circuitry communicates with memory 112, which can be of any form, such as read-only memory (ROM), random access memory (RAM), non-volatile memory such as EEPROM or Flash, etc. The analog circuitry 108, digital circuitry 110 and memory 112 may be formed on a single semiconductor chip or device.

A power supply 114 defines a type of tag. For example, the power supply can be a battery, making the tag 100 an active tag. Alternatively, the power supply can be energy storage circuitry to permit the tag to passively harvest and store electromagnetic energy received from the reader 102. The tag 100 can also be a hybrid tag that employs both passive and active features.

The reader 102 includes an antenna 116 coupled to a radio 118. A processor or digital circuitry 120 communicates with the radio to provide appropriate signals to the tag 100, and receive data therefrom. For example, as described below, the processor/digital circuitry 120 may include a maximum likelihood detector or maximum likelihood detecting functions for processing received STBC signals from the tag 100. A memory 122 stores data received from the tag, as well as instructions for operating the reader. Input/output circuitry 124 can be any of a variety of devices or circuitry. For example, the reader may include a trigger or button when employed as a hand-held reader (often with a portable power source), as well as include a display, speakers and/or output port for wired connection with an external computer or network. Alternatively, the reader could include any of a variety of sensors to cause the reader to automatically enter a reading or interrogation mode based on a signal from one or more sensors.

The reader can, of course, be of any possible configuration known in the RFID field. The reader may also employ STBC encoding circuitry or instructions to encode and transmit data using STBC encoding to tags or external receivers. While the system of FIG. 1 is shown with a tag having two antennas and a reader having a single antenna, other alternatives are possible, so long as the tag or the reader has two or more antennas, and the other component in the system has one or more antennas, where the system operates with spatial diversity.

In operation, the tag 100 can operate normally using existing RFID standards, but can also operate under an alternative communication node employing space-time block coding, as described herein. Thus, the tag can provide an initial communication to the reader indicating that the tag is capable of STBC communications, and thus the reader can begin using STBC communication techniques with the tag (e.g., with appropriate decoding). Alternatively, the tag can have no standard operating protocol, and work only in a STBC mode.

Figure 2:
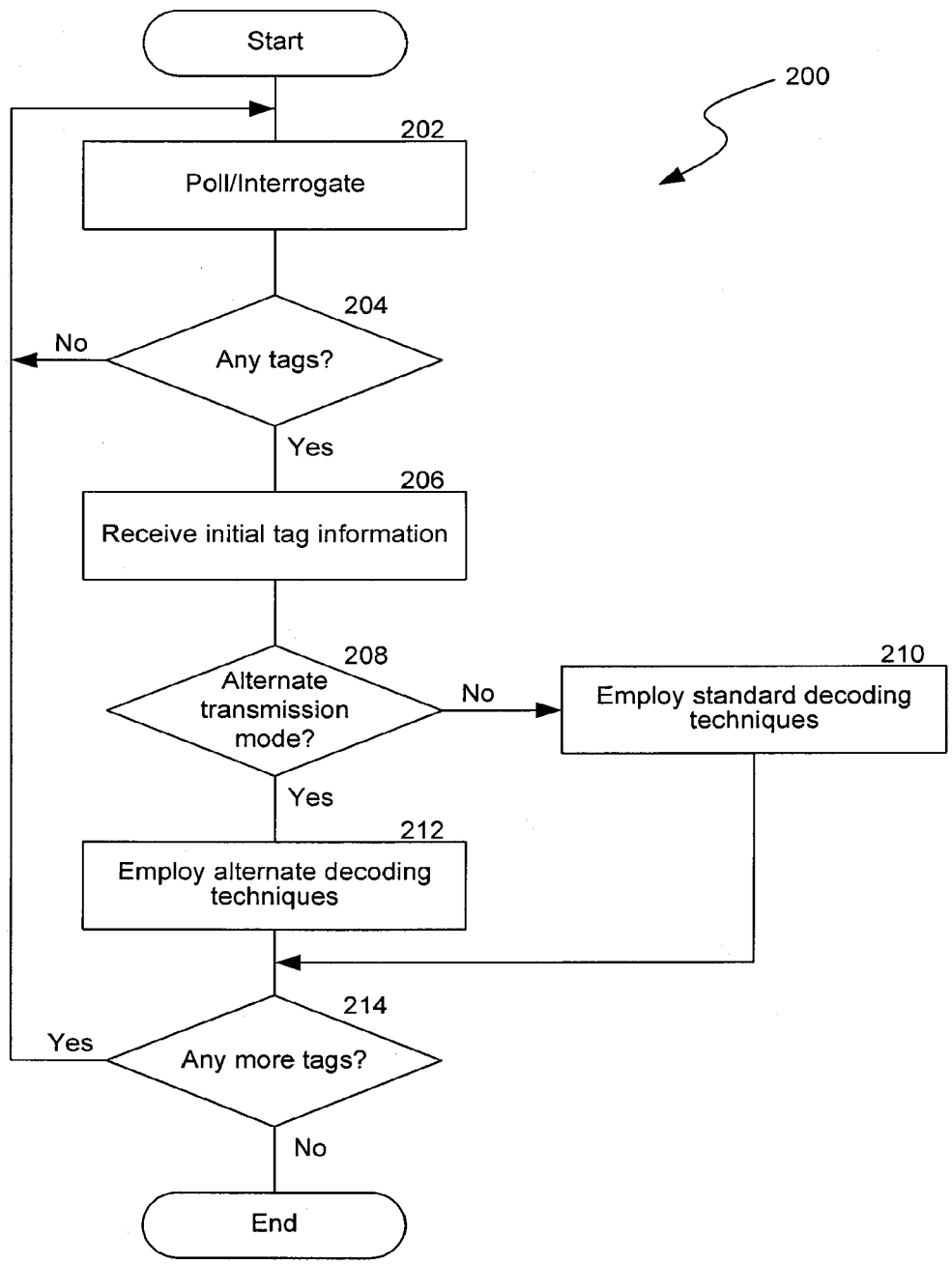
FIG. 2 is a flow diagram illustrating an example of a routine performed by the reader for reading the RFID tag of FIG. 1.

Referring to FIG. 2, an example of a routine 200 stored in the memory 112 of the reader 102 is shown for handling RFID tags employing two or more forms of alternate coding or modulation. The routine 200 can be created as computer-executable instructions that may be interpreted not only by the reader or other specialized device, but also a general-purpose computer. The routine may be not only stored in the memory 122, but also stored and distributed on computer-readable media, including magnetically or optically readable computer disks, hard-wired or preprogrammed chips (e.g., EEPROM semiconductor chips), nanotechnology memory, biological memory, or any other data storage media. Indeed, computer implemented instructions, and other aspects of the invention may be distributed over the Internet or over other networks (including wireless networks), or on a propagated signal on a propagation medium (e.g., an electromagnetic wave, sound wave, etc.) over a period of time, or they may be provided on any analog or digital network (packet switched, circuit switched, or other scheme). Thus, aspects of the routine may be not necessarily performed on a single device (e.g., the reader), but be distributed among two or more networked devices.

Beginning in block 202, the reader 102 polls or interrogates an area to identify any nearby RFID tags. If any tags are present (block 204), then the reader receives some initial information from the tag (e.g., a flag or header data), such as the tag 100 (block 206). The reader then determines from this initial information whether the tag is capable of any alternate transmission mode (block 208), and if not, employs standard decoding techniques known in the RFID field (block 210).

However, if the tag employs an alternate transmission mode, then the reader may employ alternate decoding techniques, such as the STBC communication techniques as well as associated functions, such as maximum likelihood detecting functions, as described herein (block 212). If any more tags are present (block 214), then the process loops back to block 202, otherwise, the process ends.

In general terms, STBC is a mapping M between a set of symbols subject to transmission (input symbols) and actual transmitted symbols (output symbols) organized in sequences. The number of transmitted sequences is equal to a number of transmitters, $N_T$. The ratio of the length of the input sequences over the length of the output sequences is defined as a rate of STBC, $R_S$. It is assumed that the dimensions of an input symbol constellation and an output symbol constellation are the same. Thus, $$R_s = \frac{|M(x)|}{|x|},$$

where $|z|$ is a size of the vector z.

Assuming that the communication channel is frequency flat, then the received signals at the receiver can be represented as follows:

$$y=H*M(x)+n,$$

where y is a $(N_R,1)$ vector of the received signal; H is a $(N_T,N_R)$ channel transfer matrix; n is a $(N_R,1)$ vector describing Gaussian random noise and interference; and x is a $(N_T,1)$ vector of the transmitted signal.

Orthogonal space-time block codes allow optimal maximum likelihood detection to be performed individually on individual symbols due to the cancellation of mutual symbol interference. In the case of two transmitters and one receiver, e.g. the RFID tag of FIG. 1 that has two antennas and the reader with only one antenna, an STBC scheme can be described as follows. Two blocks of symbols $x_1$ and $x_2$ are transmitted at the same time $t_1$ from respective first and second antennas. At time $t_2$, symbols $-x_2^*$ and $x_1^*$ are transmitted from the same corresponding antennas. In matrix form the transmission can be presented as follows:

$$\begin{Vmatrix} x_1 & x_2 \\ -x_2^* & x_1^* \end{Vmatrix}, \quad (1)$$

where $x_i^*$ means a complex conjugate to $x_i$ (and conjugation is simply negating the complex portion of each symbol). Each symbol includes a real and a complex or imaginary part. Further, each symbol can form part of a symbol constellation that represents a coding between a particular symbol value and a corresponding digital or bit sequence under any of various known symbol constellation mapping schemes, such as 8, 16 or 32 quadrature amplitude modulation (QAM).

If a channel transfer matrix is $$H(t) = \begin{Vmatrix} h_1(t) \\ h_2(t) \end{Vmatrix},$$

where $h_i(t)$, i=1,2, define time-invariant complex multiplicative distortion as constants, e.g. $h_i(t)=\mu_i e^{j\vartheta_i}$, i=1,2, the received signals at time $t_1$ and $t_2$ will be as follows:

$$y(t_1)=h_1(t_1)x_1(t_1)+h_2(t_1)x_2(t_1)+n_1,$$

$$y(t_2)=-h_1(t_2)x_2^*(t_2)+h_2(t_2)x_1^*(t_2)+n_2.$$

Since $x_i(t_1)=x_i(t_2)=x_i$, and $h_i(t_1)=h_i(t_2)=h_i$, i=1,2, we will have $$y(t_1)=h_1 x_1+h_2 x_2+n_1,$$

$$y(t_2)=-h_1 x_2^*+h_2 x_1^*+n_2 \quad (2)$$

The combination of the two received signals $y(t_1)$ and $y(t_2)$ will provide to a maximum likelihood detector the following signals:

$$c_1=h_1^* y(t_1)+h_2 y^*(t_2)=(\mu_1^2+\mu_2^2)x_1+h_1^* n_1+h_1 n_2^*,$$

$$c_2=h_2^* y(t_1)-h_1 y^*(t_2)=(\mu_1^2+\mu_2^2)x_2-h_1 n_2^*+h_2^* n_1.$$

Figure 3:
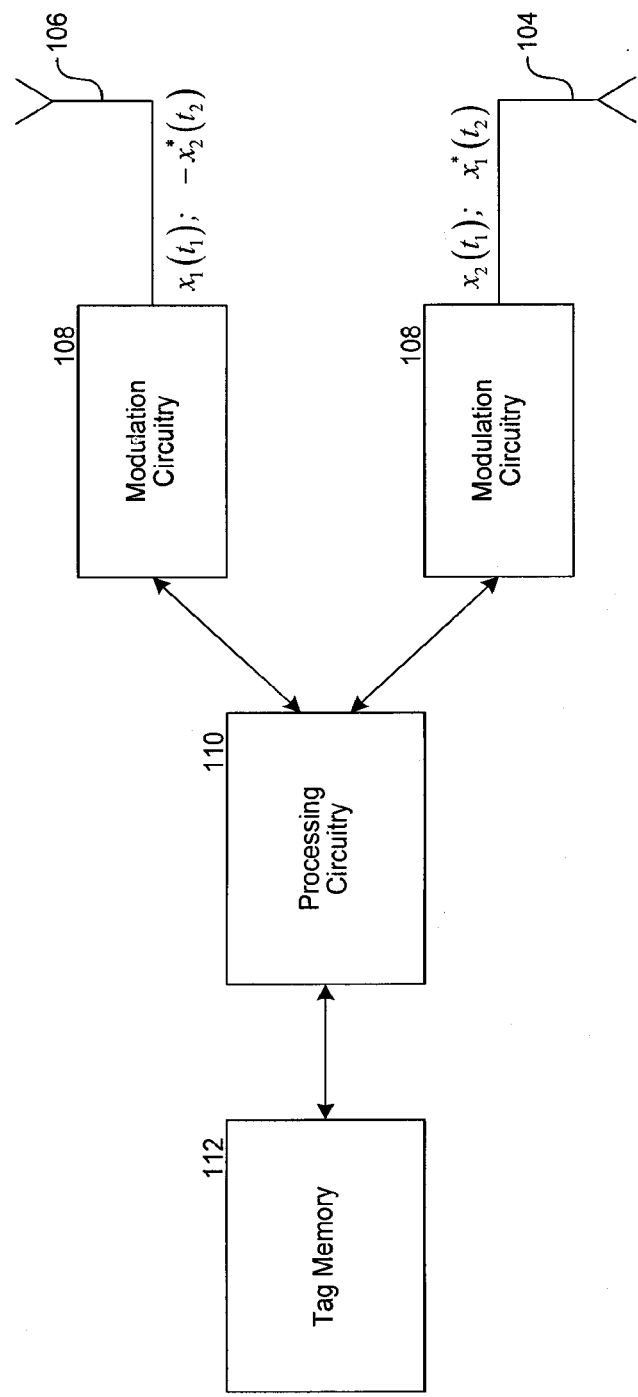
FIG. 3 is showing a general view of RFID tag with two antennas operationally connected to two modulating channels.

An example of an RFID tag with two antennas operationally connected to two modulating channels is shown on FIG. 3. As shown, the analog circuitry is divided into two channels of modulation circuitry to produce the sequence of transmitted symbols:

$$x_1(t_1), -x_2^*(t_2)$$

$$x_2(t_1), x_1^*(t_2)$$

Matrix (1) may be expressed through any combination of Hurwitz-Radon matrices of size 2. The Hurwitz-Radon matrices $A_i$, i=0,1, ..., m, are L×L integer matrices that have the following properties:

1. $A_i A_i^T = I_L$, where $I_L$ is L×L identity matrix;
2. $A_i = -A_i^T$;
3. $A_i^T A_j = -A_j^T A_i$; and
4. If $A_j$, j=1, ..., N are Hurwitz-Radon matrices, then $$\left(\sum_{j=1}^N a_j A_j\right)\left(\sum_{j=1}^N a_j A_j\right)^T = \sum_{j=1}^N a_j^2 I.$$

Any family of Hurwitz-Radon matrices can be composed from the following 2×2 matrices:

$$P = \begin{Vmatrix} 0 & 1 \\ 1 & 0 \end{Vmatrix}; Q = \begin{Vmatrix} 1 & 0 \\ 0 & -1 \end{Vmatrix}; R = \begin{Vmatrix} 0 & 1 \\ -1 & 0 \end{Vmatrix}.$$

Therefore, matrix (1) may be composed as $$\left\| \begin{matrix} x_1 & x_2 \\ -x_2^* & x_1^* \end{matrix} \right\| = \left\| R\begin{pmatrix} s_1(1) \\ s_1(2) \end{pmatrix} + jI_2\begin{pmatrix} s_2(1) \\ s_2(2) \end{pmatrix}, I_2\begin{pmatrix} s_1(1) \\ s_1(2) \end{pmatrix} + jR\begin{pmatrix} s_2(1) \\ s_2(2) \end{pmatrix} \right\| =$$

$$\left\| \begin{matrix} s_1(2) + js_2(1) & s_1(1) + js_2(2) \\ -s_1(1) + js_2(2) & s_1(2) - js_2(1) \end{matrix} \right\|.$$

Thus, in addition to matrix (1) there are three more matrices derived based on Hurwitz-Radon matrices with desired properties such as $$U_1 = \left\| \begin{matrix} x_1 & x_2 \\ x_2^* & -x_1^* \end{matrix} \right\|, U_2 = \left\| \begin{matrix} x_1 & x_2 \\ x_2^*i & -x_1^*i \end{matrix} \right\|, U_3 = \left\| \begin{matrix} x_1 & x_2 \\ -x_2^*i & x_1^*i \end{matrix} \right\|.$$

In this case equations (2) will be as follows:
$U_1$:

$y(t_1) = h_1 x_1 + h_2 x_2 + n_1$ $y(t_2) = h_1 x_2^* - h_2 x_1^* + n_2$ $U_2$:

$y(t_1) = h_1 x_1 + h_2 x_2 + n_1$ $y(t_2) = h_1 x_2^* i - h_2 x_1^* i + n_2$ $U_3$:

$y(t_1) = h_1 x_1 + h_2 x_2 + n_1$ $y(t_2) = -h_1 x_2^* i + h_2 x_1^* i + n_2$

The communication described above between an RFID tag and a reader should substantially increase reliability of communications and decrease bit error rate (BER).

Overall, a pair of symbols may form a block, which is encoded in at least one of four ways as shown above. Each symbol in the block is transmitted at different times over different antennas. Thus, both space and time diversity are realized. Alternatively or additionally, different diversities may be employed, such as frequency or coding diversity, such that blocks of symbols may be sent over different frequencies, or employing different coding schemes (e.g. orthogonal codes) in addition to or in alternative to the spatial diversity (two or more antennas), or time diversity (same symbol sent at different times).

For example, the transmitter, such as the tag, employs diversity in the transmitted signals received by the receiver, through spatial diversity employing two antennas, and time diversity by using two time intervals for transmitting encoded symbols. Alternatively or additionally, the tag could transmit using two different frequencies instead of, or in addition to, using two time intervals.

Alternate embodiments may alter which symbol is sent over which antenna. For example, while the example above shows each antenna first transmitting an unmodified symbol, followed by a modified signal for each block, one antenna could instead always transmit unmodified symbols (not subjected to negation or complex conjugation), while the other antenna always sends the modified symbols.

Figure 4:
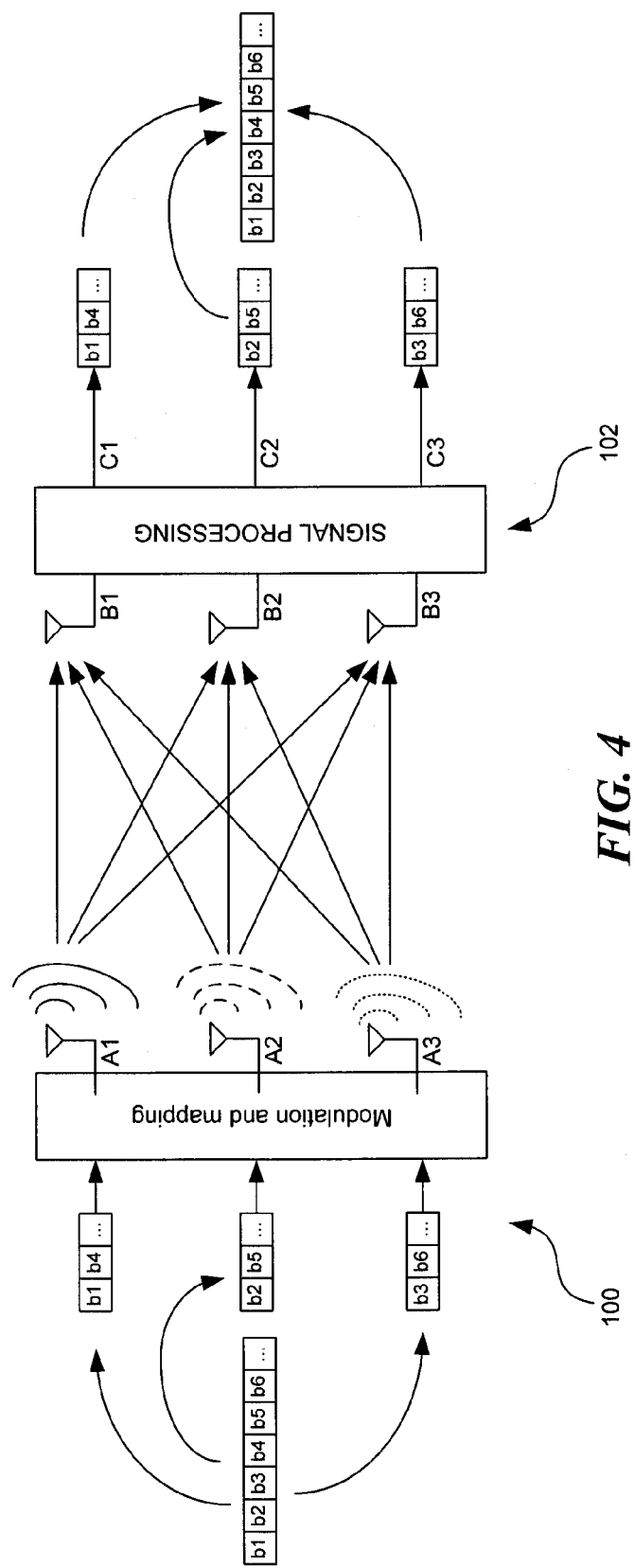
FIG. 4 shows a general view of MIMO communication between an RFID tag and a reader under an alternative embodiment.

Another alternative approach is to boost the communication rate based on multiple-transmit and multiple-receive antennas, i.e. multiple-input multiple-output (MIMO) techniques. FIG. 4 shows an example of such a MIMO alternative. As shown in this example, both the tag and the reader have three antennas each. Alternative embodiments may include more or less antennas for each component, as long as block coding is employed and two or more diversities are employed by the tag or the reader.

While a maximum likelihood detector or related functions are described above, any other known detector or decoder may be deployed.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C §112, sixth paragraph, other aspects may likewise be embodied as a means-plus-function claim. (Any claims intended to be treated under 35 U.S.C. §112, sixth paragraph will begin with the words "means for".) Accordingly, the inventors reserve the right to add additional claims after filing the application to pursue such additional claim forms for other aspects of the invention.

I claim:

1. An RFID tag, comprising:
a tag substrate;
at least first and second spatially separated antennas formed on the substrate;
a memory received by the substrate and storing tag data;
processing circuitry;
first and second modulation circuitries corresponding to the first and second spatially separated antennas,
    wherein the processing circuitry and first and second modulation circuitries are received by the substrate and coupled among the first and second antennas and the memory,
    wherein the processing circuitry and first and second modulation circuitries are configured to:
        receive the tag data; and
        generate a protocol communication based on the tag data,
            wherein the protocol communication indicates that the RFID tag is configured to use space-time block coding (STBC),
        produce first and second blocks of related output symbols,
            wherein the first block of output symbols includes at least a first pair of symbols and, the second block of output symbols includes at least a second pair of symbols, and
            wherein at least some of the symbols in the second block of output symbols is a negation and/or complex conjugate of a related symbol in the first block of output symbols; and
    wherein the first antenna transmits the first block of symbols, and the second antenna transmits the second block of symbols.

2. The RFID tag of claim 1 wherein the processing circuitry is further configured to:
transmit the protocol communication; and
enter an STBC communications mode.

3. The RFID tag of claim 1 wherein the first and second pairs of symbols are respectively $x_1$, $-x_2^*$ and $x_2$, $x_1^*$, or $x_1$, $x_2^*$ and $x_2$, $-x_1^*$, or $x_1$, $x_2^*i$ and $x_2$, $-x_1^*i$, or $x_1$, $-x_2^*i$ and $x_2$, $x_1^*i$.

4. The RFID tag of claim 1 wherein the first pair of symbols is $x_1$, $x_2$ and the second pair of symbols is $-x_2^*$, $x_1^*$ or $x_2^*$, $-x_1^*$ or $x_2^*i$, $-x_1^*i$ or $-x_2^*i$, $x_1^*i$.

5. The RFID tag of claim 1 wherein the RFID tag is a passive tag.

6. The RFID tag of claim 1 wherein the processing and modulation circuitries are further configured to transmit the first block using a first frequency, and transmit the second block using a second frequency.

7. An RFID reader, comprising:
antenna means for wirelessly exchanging signals
    wherein the signals include a protocol communication and first and second blocks of symbols and,
    wherein the antenna means includes at least first and second spatially separated antennas for concurrently receiving the first and second blocks of symbols, respectively;
a memory means for storing data; and
processing and circuitry means, coupled among the antenna means and the memory means, for:
    processing the protocol communication,
        wherein the protocol communication indicates that an RFID tag is configured to use space-time block coding (STBC), and
    concurrently decoding the first and second blocks of symbols to extract RFID tag data stored in the RFID tags,
        wherein the RFID tag data is encoded using STBC.

8. The RFID reader of claim 7 wherein the processing and circuitry means further includes means for transmitting data using STBC.

9. The RFID reader of claim 7 wherein the processing and circuitry means further comprises means for entering an STBC communications mode responsive to said processing the protocol communication.

10. A semiconductor device for use in an RFID tag, the device comprising:
encoder circuitries configured to receive incoming tag data stored by the RFID tag and convert the tag data into blocks of multiple symbols,
    wherein the encoder circuitry is further configured to generate encoded sequences of symbols in at least some of the blocks, and,
    wherein the generated encoded sequences include selectively negating symbols, selectively complex conjugating symbols, and selectively complex conjugating symbols;
processing circuitry configured to receive at least some of the incoming tag data and generate a protocol communication based on the incoming tag data,
    wherein the protocol communication indicates that the RFID tag is configured to use diversity in the transmitted encoded sequences based on time diversity, coding or frequency diversity; and
an output portion for outputting the protocol communication and the blocks of multiple symbols to be transmitted by the RFID tag,
    wherein the RFID tag includes at least two spatially separated transmitting antennas,
    wherein each of the at least two transmitting antennas transmits a differently encoded sequence, and
    wherein the RFID tag creates further diversity in the transmitted encoded sequences based on time diversity, coding or frequency diversity.

11. The semiconductor device for use with an RFID tag of claim 10 wherein each block of multiple symbols comprises two symbols.

12. The semiconductor device for use with an RFID tag of claim 10 wherein the encoder circuitries are further configured to provide time diversity by replicating symbols among blocks of symbols.

13. The semiconductor device for use with an RFID tag of claim 10, further comprising memory, coupled to the encoder circuitry, for storing the tag data, and analog circuitry coupled among the antennas and the output portion for converting the blocks of multiple symbols into signals for transmission by the antennas.

14. An apparatus for use in an RFID data collection system, the apparatus comprising:
an antenna portion for wirelessly exchanging signals including a protocol communication and first and second blocks of symbols,
wherein the antenna means includes at least first and second spatially separated antennas for concurrently transmitting or receiving the first and second blocks of symbols, respectively;
a memory portion for storing RFID data; and
a signal processing portion coupled among the antenna portion and the memory portion, wherein the signal processing portion is configured to:
process or generate the protocol communication,
wherein the protocol communication indicates that an RFID tag is configured to use space-time block coding (STBC),
enter a STBC communications mode responsive to said processing or generating the protocol communication, and
receive RFID data and to at least encode or decode the received RFID data via space-time block codes.

15. The apparatus of claim 14 wherein the apparatus is an RFID tag, and wherein the signal processing portion is configured to encode the received RFID data via space-time block codes.

16. The apparatus of claim 14 wherein the apparatus is an RFID tag reader, and wherein the signal processing portion is configured to decode the received RFID data via space-time block codes.

17. A non-transitory computer-readable medium having programming instructions stored thereon, wherein the programming instructions, when executed by at least one device, cause the at least one device to:
process a protocol communication initiated by an RFID tag,
wherein the protocol communication indicates that an RFID tag is configured to use space-time block coding (STBC);
enter a STBC communications mode responsive to processing the protocol communication;
receive the tag data from the RFID tag, wherein the tag data is encoded using STBC;
decode the space-time block encoded tag data; and,
output the decoded space-time block encoded tag data for data storage or automated data processing.

18. The non-transitory computer-readable medium of claim 17 wherein the programming instructions, when executed by the at least one device, further cause the device to initially communicate with the RFID tag to determine whether the RFID tag can provide space-time block encoded RFID tag data from at least first and second spatially separated antennas formed on the substrate.

19. A wireless data collection system comprising:
an RFID tag having:
at least first and second spatially separated antennas to transmit blocks of symbols;
an encoder configured to generate from incoming symbols a first block of output symbols for transmission by the first antenna, and a second block of output symbols for transmission by the second antenna,
wherein the second block of output symbols is related to the first block of output symbols;
wherein each one of the output symbols in the first block of output symbols is related, as a set of symbols, with one of the output symbols in the second block of output symbols, and
wherein one symbol in each set of symbols is a negation, complex conjugate, or a negative complex conjugate of the other symbol in the set of symbols; and,
an RFID reader module having at least one antenna and configured to exchange wireless signals with the RFID tag;
wherein at least the RFID tag or the RFID reader is configured to transmit blocks of symbols, wherein the signals have two or more diversities selected from the group of: space diversity, time diversity, frequency diversity and coding diversity.

20. The wireless data collection system of claim 19 wherein the both the RFID tag and the RFID reader module have N number of antennas, where N is greater than or equal to three.

21. The wireless data collection system of claim 19, the RFID tag further having:
a memory storing tag data; and
processing circuitry and modulation circuitries corresponding to the first and second spatially separated antennas, the processing circuitry and modulation circuitries coupled among the first and second antennas and the memory.

22. The wireless data collection system of claim 21, wherein the processing circuitry and modulation circuitries are further configured to:
receive the tag data; and
generate a protocol communication based on the tag data, wherein the protocol communication indicates that the RFID tag is capable of using space-time block coding (STBC).

* * * * *